Dec. 19, 1939.   W. A. ABEGG   2,183,526
ROTARY TABLE BUSHING AND MEANS FOR HANDLING SAME
Filed Oct. 29, 1937   5 Sheets-Sheet 1

Inventor
Walter A. Abegg.

Attorney.

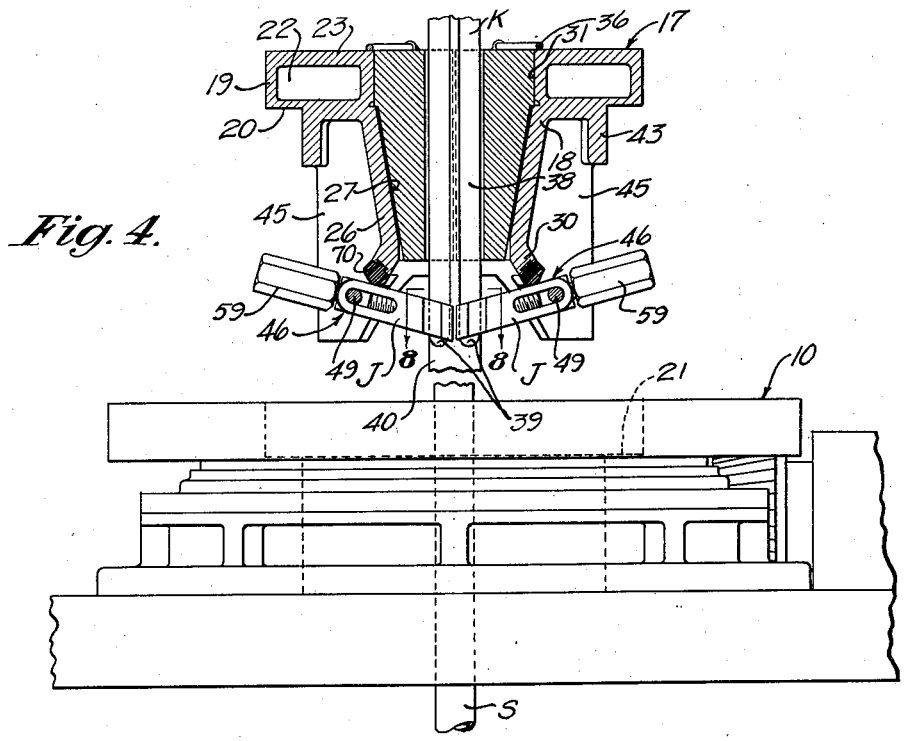
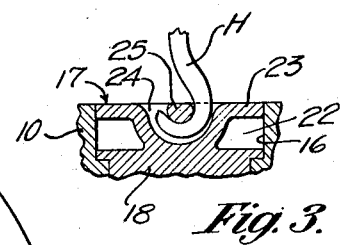
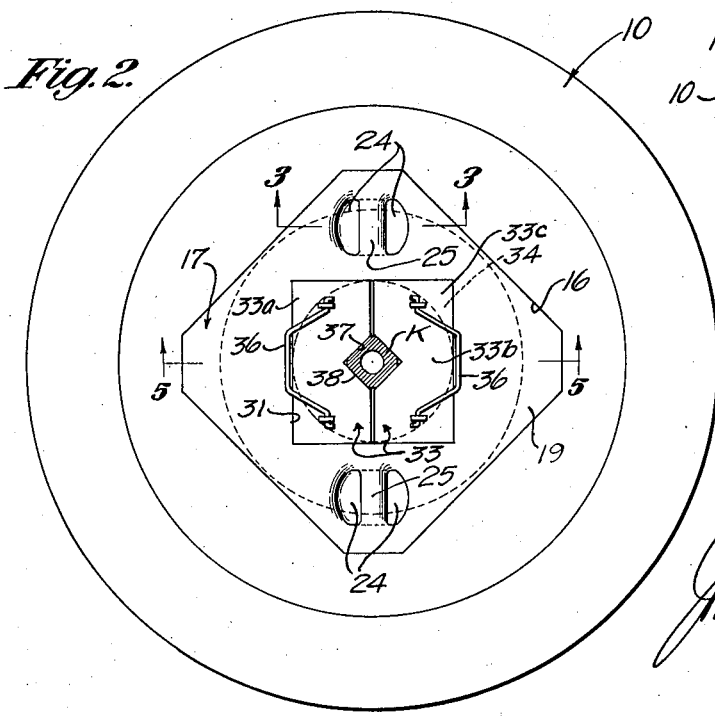

Dec. 19, 1939.   W. A. ABEGG   2,183,526
ROTARY TABLE BUSHING AND MEANS FOR HANDLING SAME
Filed Oct. 29, 1937   5 Sheets-Sheet 3

Inventor
Walter A. Abegg.

Attorney.

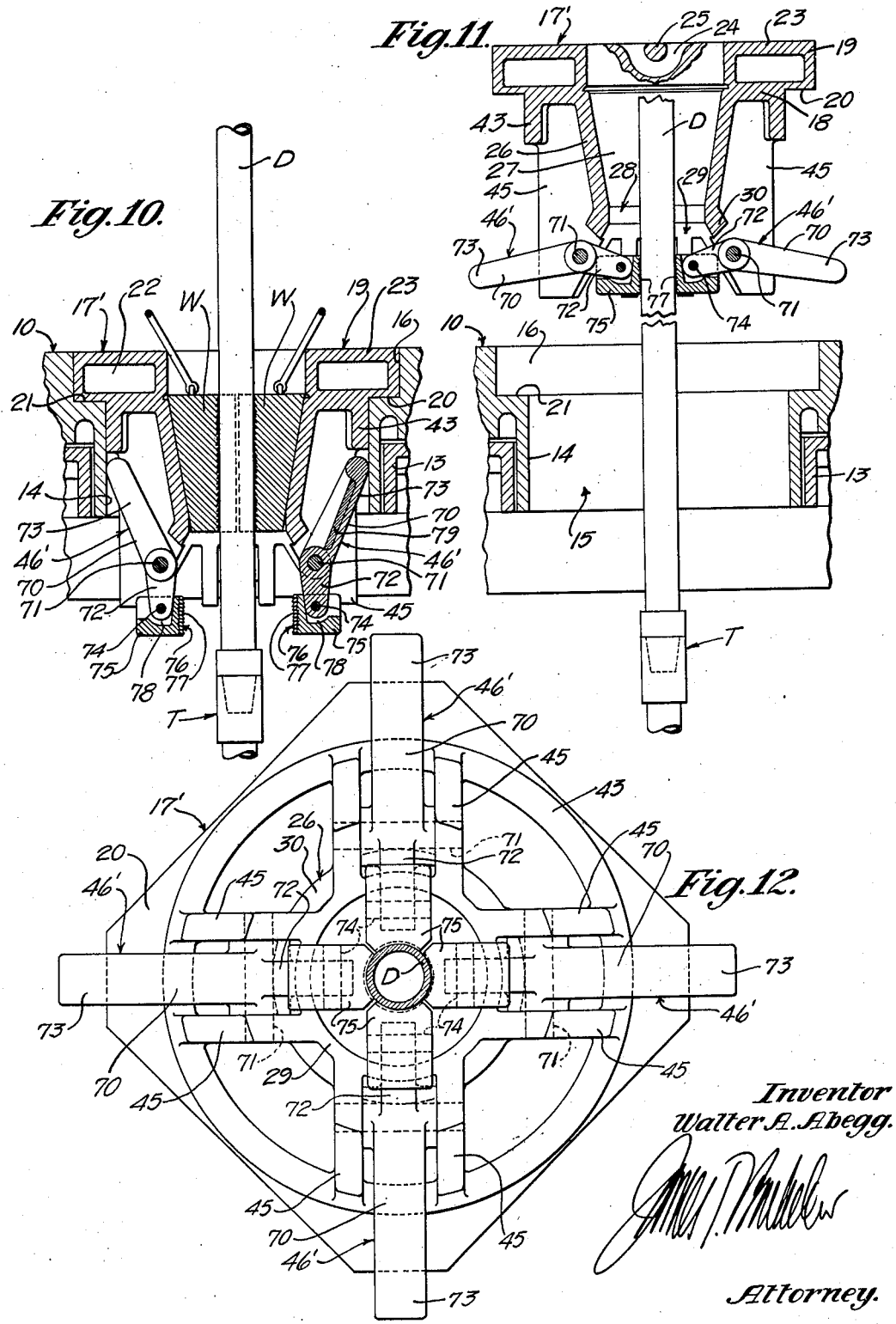

Dec. 19, 1939.  W. A. ABEGG  2,183,526
ROTARY TABLE BUSHING AND MEANS FOR HANDLING SAME
Filed Oct. 29, 1937  5 Sheets-Sheet 5
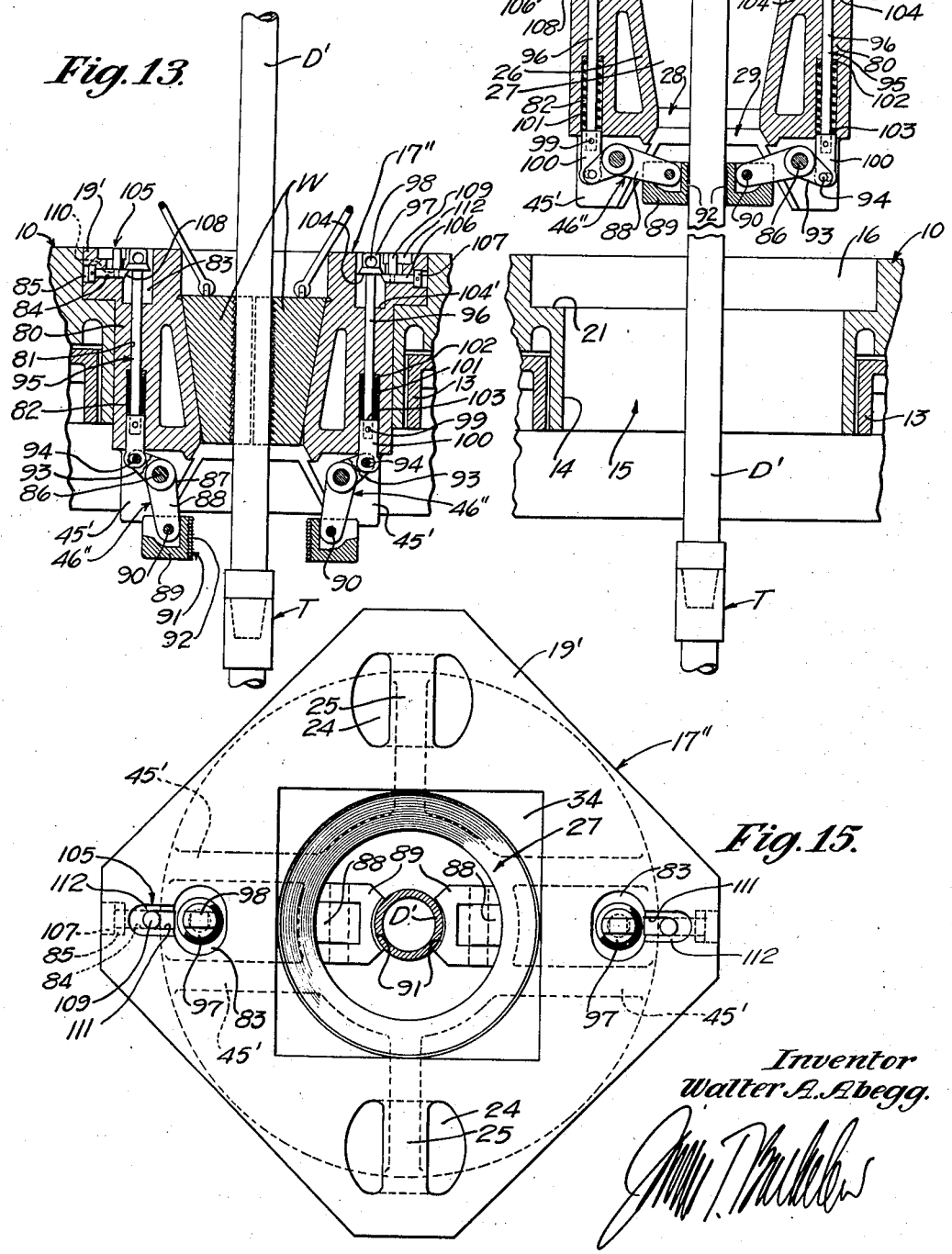
Inventor
Walter A. Abegg.
Attorney.

Patented Dec. 19, 1939

2,183,526

UNITED STATES PATENT OFFICE 2,183,526

ROTARY TABLE BUSHING AND MEANS FOR HANDLING SAME

Walter A. Abegg, Los Angeles, Calif., assignor of one-half to B. Reinhold, Los Angeles, Calif.

Application October 29, 1937, Serial No. 171,759

9 Claims. (Cl. 255—23)

This invention has to do generally with rotary drilling apparatus, and is more particularly concerned with table bushings and means for handling same.

As is well known, the usual rotary table has a large central bore through which the vertical drill stem extends, the table bore being bushed down with a removable table-bushing to take removable stem-engaging members. These engaging members are, in one case, in the nature of wedge-slips for supporting the drill stem while joints are being added to or disconnected from the stem, and, in another case, are kelly or drive bushings adapted to transmit rotary drive from table to stem.

Occasions arise when it becomes essential that table bushings be withdrawn from or re-inserted in the table bore while the drill stem remains in its position of vertical extension through the table—occasions when it is impossible or, at least, very undesirable to strip or replace the bushing over the upper end of the stem.

For instance, in drilling through certain formations, gas pockets may be suddenly encountered. It then becomes desirable or essential immediately to apply a blow-out preventer to the stem and thus shut off the flow of gas around the stem. To make such applications, it is usually necessary to clear the table bore around the stem, it following that the table bushing must be quickly withdrawn from the table bore without pulling the stem.

In order to allow for such clearing of the table bore, it has always been considered necessary to make table bushings up in the form of segmental sections, so they may be withdrawn, section by section. However, the sections usually are hingedly connected so, after the bushing has been lifted as a unit from the bore, the removal of a locking or hinge pin will allow the sections to be swung apart to clear them entirely from the stem.

This sectional construction of bushings has serious consequences. Among these is the fact that original looseness between the sections or between the table and the sections, or, if the bushing is of the hinged type, the original looseness of the hinge connections or looseness which quickly develops at those points, result in poor fits between the table, the bushing sections and the work-engaging elements. Once started, such conditions are rapidly self-aggravated. The stem then starts to "slap" sidewise or vibrate as it is being rotated, which not only batters all the parts involved, with obviously harmful effect, but actually weakens to a very serious extent that portion of the stem which is engaged by the gripping elements.

This weakening is hastened by reason of the poor fit between the bushing sections and the engaging members. For instance, the wedge slips become disaligned once the bushing starts to wear, as do also the bushing sections themselves. This results in uneven pressural engagement of the slips with the pipe and thereby there are imposed circumferentially uneven stresses and strains on the stem which quickly result in metal-fatigue. Analysis of a great number of "twist-offs" has proven that the majority of such failures occur by reason of the conditions which have been described immediately above.

It will be recognized that all these shortcomings and disadvantageous effects might be avoided were a one-piece bushing to be used, but heretofore it has been considered impossible to utilize such bushings because of the necessity of their removal or insertion with the drill stem remaining in place, and hence such bushings, so far as I am aware, have never been made or used.

Therefore, it is among the objects of my invention to provide a one-piece bushing and means for handling such a bushing so it may be inserted or withdrawn while the drill stem remains in its position of vertical extension through the table.

Generally, I accomplish this by providing means whereby the one-piece bushing may be elevated clear of the table bore (but, of course, still around the stem) and then supporting it in elevated position by transferring the weight of the bushing to the stem or pipe itself. As illustrative of means for accomplishing this transfer, I have shown several embodiments of the invention, but such showings and descriptions thereof, are not to be considered as limitative on the invention, considered in its broader aspects. It is to be noted, also, that certain features of the invention are not limited in usefulness to a one-piece bushing. That is, the weight transfer means may be applied to a sectional bushing of the hinged type and still give advantage over the usual sectional bushing, it being among the objects of the invention to provide such means for use in connection with any bushing that is capable of being lifted as a unit, irrespective of the number of sections or parts of which it may be made up. Therefore, such of the claims as do not specify the one-piece feature are not to be considered as limited thereto.

The means are such that the actual insertion or removal of the bushing may be accomplished with less effort and in less time than is required in lifting and opening up of sectional bushings, as will appear from the following detailed description wherein further objects and features of the invention will be made apparent. Reference will be had to the accompanying drawings, in which:

Fig. 2 is a plan view of Fig. 1;

Fig. 3 is an enlarged, fragmentary section on line 3—3 of Fig. 2;

Fig. 4 is a view similar to Fig. 1 but showing the bushing raised from the table and supported by the drill stem;

Fig. 10 is a view generally similar to Fig. 1 but showing a different type of pipe-engaging means and showing that means applied to a circular section of drill stem rather than to the polygonal kelly;

Fig. 11 is a view similar to Fig. 10 but showing the bushing in elevated position;

Fig. 12 is an enlarged, bottom plan view of the table-bushing shown in Fig. 11;

Fig. 13 is a medial longitudinal section through a variational form of bushing;

Fig. 14 is a view similar to Fig. 13 but showing the parts in different relative positions; and Fig. 15 is an enlarged plan view of Fig. 14.

Figures 1, 8, 9:
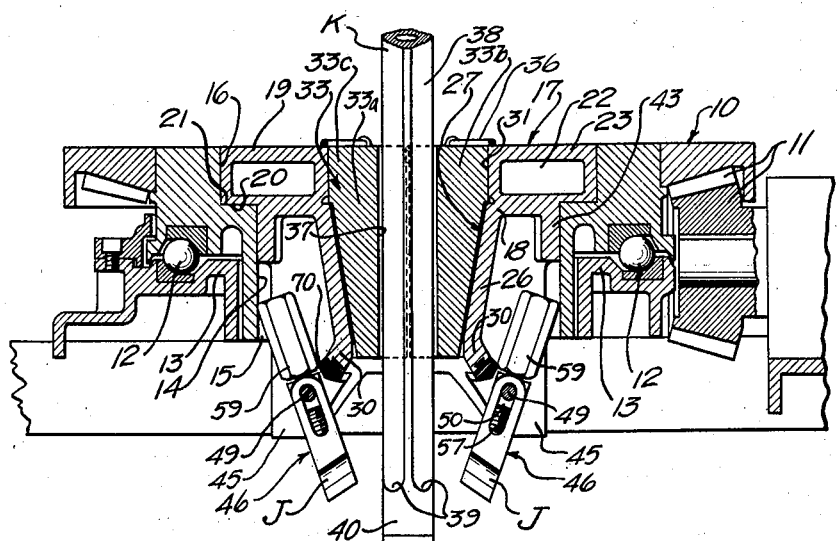
Fig. 1 is a longitudinal medial section through a rotary table with which my invention is associated.
Fig. 8 is a fragmentary section on line 8—8 of Fig. 4.
Fig. 9 is a view similar to Fig. 8 but showing a different adjustment of the gripping members and with the gripping members applied to a different point on the kelly from that illustrated in Fig. 4.

In Fig 1 the rotary table indicated generally at 10 is adapted to be driven by such means as the gears conventionally illustrated at 11, the table itself being supported in any suitable manner, such as on bearing 12, for rotation with respect to stationary base 13. Wall 14 defines the cylindrical portion of table-bore 15, the upper end portion 16 of the bore being angular, as viewed in plan.

The table bushing is generally indicated at 17. While it lies within the scope of the invention, considered in certain of its aspects, to make up bushing-body 18 of several parts permanently held together or, at least, held together during its normal operation, the body is preferably made up of a one-piece casting. Also, as already has been noted, other features of the invention are applicable with advantage to hinged, sectional bushings which may be adapted to be opened up in their normal manner for removal at certain times and at other times lifted bodily clear of the table, without being opened up, by means such as here shown applied to one-piece bushings.

The top or head portion 19 of body 18 is angular, as viewed in plan, being complementary to bore-portion 16, the consequent inter-fit providing means whereby rotary movement of the table is transmitted to the bushing. The underside or shoulder 20 of head 19 is adapted to rest on the upwardly facing table-shoulder 21, shoulder 21 thus taking the weight of the bushing when it is seated and maintaining its upper face substantially flush with the upper face of the table.

Head 19 is preferably cored out as at 22, the top plate 23 of the head being recessed as at 24 in a manner to leave bars 25 beneath which hoisting hooks H (one shown in Fig. 3) may be engaged for lifting and lowering the bushing under certain conditions to be described.

Depending from head 19 is a tapered, tubular portion or sleeve 26 which defines an inwardly and downwardly tapering bore 27, the bore also preferably having a short cylindrical portion 28 near its lower end and terminating in the outwardly flaring portion 29 defined by the free end 30 of sleeve 26. In line with bore portion 27 is bore portion 31 which extends through head 19 and is preferably angular (here shown as square) as viewed in plan. This squared portion is adapted to take the angular head 33c of kelly bushing 33 which is made up of two symmetrical halves 33a and 33b, the interfit between bore 31 and head 33c providing a rotary drive connection from the table-bushing to the kelly-bushing. Head 33c of the kelly-bushing rests upon shoulders 34 of the table-bushing while the conical portion 35 is taken, preferably with clearance, within the complementary conical bore 27 of the table-bushing.

The bore portion 27 of the table-bushing, as here shown, is also adapted to take wedge-slips, and in other views which will be described later such slips are illustrated. Of course, when wedge-slips are used, the non-circular configuration of bore portion 31 has no particular function and, where table bushings are employed which are only to take wedge-slips, it is not essential that the upper portions of their bores have the angular characteristics known in the figures now under discussion.

The sections of kelly bushing 33 are provided with lifting handles 36 and their opposed faces are cut out to form a bore 37 which is of a shape, viewed in plan, to fit about the particular kelly which happens to be in use. In the instant case, hollow kelly or pipe K is externally square except for the rounded corners and, accordingly, kelly bushing bore 37 is likewise substantially square. In fashioning kelly K, flats 38 are milled away, which leaves shoulders 39 between the squared portion and the cylindrical portion 40. These shoulders may play a part in the operation of my device, as will be later made clear, and, of course, need not be formed in the particular manner described. The kelly is suspended from usual hoisting hook 41 through swivel 42, hook 41 being operated from the usual draw-works (not shown).

Table-bushing 17 is initially lowered into the position as shown in Fig. 1 before the kelly is installed. Then, kelly-bushing 33 still being absent from the table-bushing, the kelly is lowered through the table-bushing bore to the position of Fig.1, whereupon kelly-bushing 33 is dropped into place. It will be seen that rotary drive from table 10 is transmitted to kelly K through table-bushing 17 and kelly-bushing 33, the angular interfit of all these parts forming the driving connection.

Figure 6:
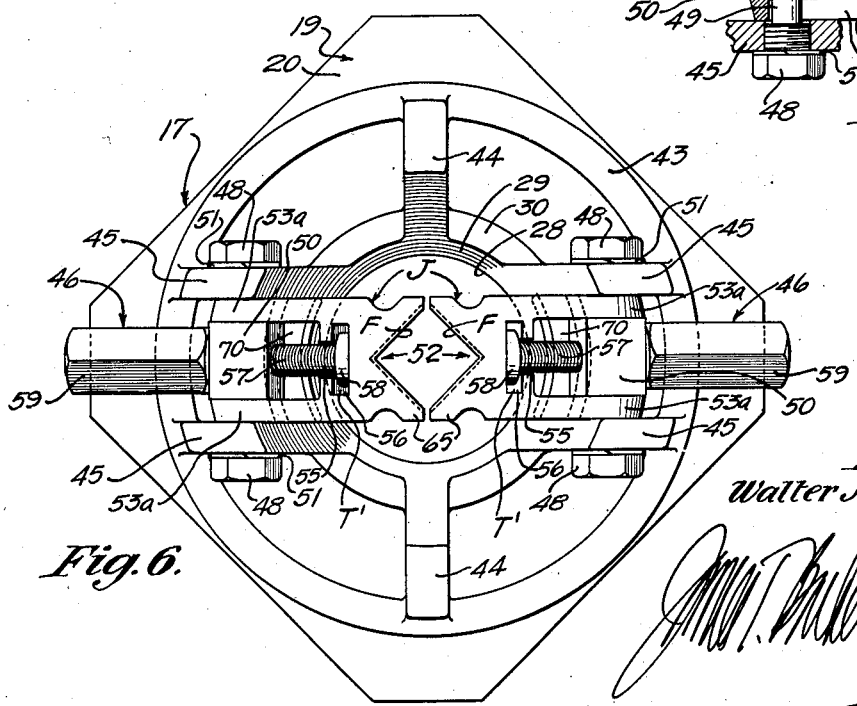
Fig. 6 is a bottom plan view of Fig. 5.

Immediately below head 19 there is provided an annular flange 43. Webs or ribs 44 and 45 extend downwardly from the flange and horizontally to sleeve 26. Flange 43 is taken in the upper end of the cylindrical portion of table bore 15. Ribs 45 are arranged in pairs at diametrically opposite sides of sleeve 26, as clearly shown in Fig. 6, and extend a short distance below the end of that sleeve. They carry the diametrically opposite, work-engaging or gripping members generally indicated at 46, but since these members are identical, I will describe but one in detail, applying the same reference numerals to the elements of the other member.

Bolts 48 are threaded into opposite sides of a given pair of ribs 45 and their opposed ends 49 are turned down to provide studs which act as trunnions for pivotally supporting the trunnion block 50, lock-washers 51 preferably being provided to prevent accidental loosening of the bolts.

Figure 7:
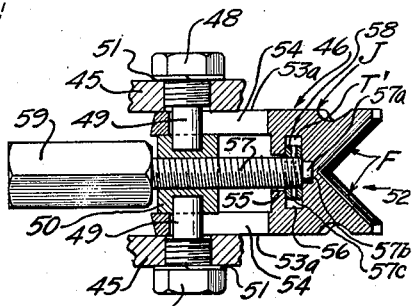
Fig. 7 is a fragmentary section on line 7—7 of Fig. 5.

Jaw J has work-gripping faces F which preferably are provided in the walls of V notch 52 and may be in the nature of serrations 53, as shown. Jaw J is in the form of a block having yoke arms 53a (Figs. 5 to 7) which are slotted longitudinally at 54 to take studs 49, providing a pivotal mounting for the jaw. A central, T-shaped opening T' is cut vertically through jaw J between yoke arms 53a, and adjustment screw 57, which is threaded through trunnion block 50, passes through slot portion 55 and across enlarged slot portion 56, the end of the screw having a pilot-portion or centering nose 57a having rotational bearing in socket 57b of the jaw. Collar 58 is pinned to screw 57 at 57c and is free to rotate within slot portion 56, though it prevents relative longitudinal movement between screw and jaw. Screw 57 is extended to form a hand or wrench grip 59 whereby the screw may be threaded in one direction or the other through trunnion block 50, the consequent bodily longitudinal movement of that screw serving, through collar 58, to shift jaw J radially with respect to the bushing or, expressed otherwise, to slide it along block 50 with respect to the pivot point and thus vary the effective length of the jaw. Thus, by adjusting the jaws towards or away from each other, the effective diameter of the opening defined by notches 52, may be varied to fit drill-stems of different diameters or to fit a given stem with varying effect.

Preferably, grips 59 are of such weight that they constantly tend to rotate members 46 in directions to project them across the lower end of bore 27 or, expressed otherwise, toward the kelly. However, as the bushing is being inserted in the table-bore, members 46 are manually held in the position of Fig. 1, and when completely inserted, the defining wall 14 of table-bore 15 holds them against swinging back. In this retracted or inoperative position, their lower ends are radially clear of the kelly. It will be noted that bore 27 is annularly spaced from the kelly by a distance corresponding to the thickness of the kelly bushing and that when the gripping members move into engagement with the kelly, as will be later described, these members horizontally bridge that annular clearance.

Members 46 may be adjusted to act in different ways, one by actually gripping the peripheral face of the kelly and another by swinging to a position where they overlie kelly-shoulders 39 but without necessarily gripping the kelly. Hence the jaws are not to be considered only as clamps or gripping members—they may also be considered as movable, shoulder-presenting or supporting members, and the claims are to be read with that understanding.

Figure 5:
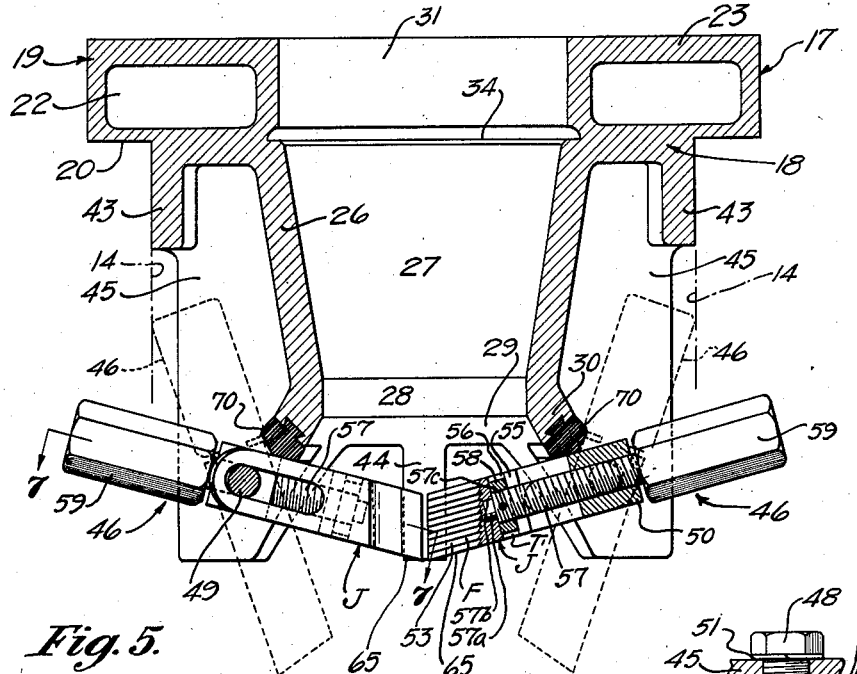
Fig. 5 is an enlarged section, parts being shown in elevation, through one form of my improved bushing, being taken on line 5—5 of Fig. 2.

First, it will be assumed members 46 have been so adjusted that when they swing to the full line position of Fig. 5 their gripping faces 53 will not engage the periphery of the kelly but their lower faces or shoulders 65 will overlie kelly shoulders 39. Starting with the parts in the positions of Fig. 1 and assuming that the table bushing 17 is to be cleared from table 10, the bushing is first elevated by applying lifting hooks to bars 25, with or without first removing the kelly bushing. As members 46 clear defining wall 14, they are freed to swing into operative or radially projected position toward the kelly. Bumpers or stops 70 provided on sleeve-end 30, and which stops may be of hard rubebr or the like, limit the rotative movement of members 46 so they stop in a position assuring that their shoulders 65 will overlie kelly shoulders 39 but with serrated faces 53 still clear of the periphery of the kelly. Such a condition is illustrated in Fig. 8.

With the table-bushing thus supported just clear of the table, kelly K is hoisted, its shoulders 39 finally engaging beneath shoulders 65 and thus, through members 46, continued elevation of the kelly will likewise elevate bushing 17 (see Fig. 4). The height to which the bushing will thus be elevated will depend entirely upon individual circumstances and choices, but in any event, it may thus be supported at such a height as to be out of the way of operators and to leave the table-bore around the drill stem accessible for packing-off operations or the like.

To re-install the bushing, it is merely necessary to lower the kelly until supporting hooks may again be applied to the bushing, whereupon the kelly is further lowered and members 46 are manually swung to their retracted positions to allow the bushing again to be lowered into the table-bore.

Instead of relying upon the engagement of the kelly shoulders with shoulders 65, members 46 may be adjusted by manipulation of screws 57 so that when they swing to operative or radially projected position, faces F will immediately engage the periphery of the kelly. In such a case, just as soon as the bushing has been lifted sufficiently to allow gripping members 46 to swing to operative position and into peripheral engagement with the kelly (see Fig. 9) the kelly may be elevated which will tend to even more tightly engage members 46 therewith and immediately the bushing will be picked up by the kelly and carried to the intended height.

It will be seen that stops 70 will prevent excessive rotation of members 46 so there is no danger that the kelly will force these members upwardly to a point which would bring their free ends above the line of centers of studs 49. Of course, members 46 may be adjusted so the kelly checks their swinging movement before stops 70 have been reached, and the studs are of sufficient cross-sectional area to resist effectively the shearing stresses placed upon them by the spreading pressure due to the "toggle" effect of members 46 as they are rotated after contact with the stem.

If the cylindrical portion of drill stem S, below kelly K, is initially within the table bore at the time bushing 17 is to be removed (which implies wedge-slips will have been substituted for kelly bushing 33) members 46 will be adjusted so, when bushing 17 is elevated clear of the table, either the cylindrical stem S will be tightly gripped between jaws J in a manner similar to that described in connection with the gripping of the square kelly, or so shoulders 65 overlie shoulder 39', presented, for instance, by the upper end of usual tool joint T, without necessarily having the jaws tightly constricted about the stem, in a manner similar to that described in connection with kelly-shoulder 39.

Figs. 10 to 12, inclusive, illustrate a somewhat different type of work-engaging means, and also show the engaged work in the form of a cylindrical drill stem or pipe rather than a polygonal kelly. Accordingly, in place of showing kelly-bushing 33, I have here illustrated usual wedge-slips W whereby the weight of the drill stem D may be taken on rotary table 10 in the manner usually employed when joints are being added to or taken from the stem. However, it is to be understood that the wedge-slips of Fig. 10 may be replaced by a kelly-bushing such as shown in Fig. 1 when a polygonal kelly is to be engaged, or, the kelly-bushing of Fig. 1 may be replaced by wedge-slips such as W when the weight of the drill stem is to be taken by the table.

Most of the showings in Figs. 10 to 13 are similar to that of Figs. 1 to 5, and therefore the description thereof need not be repeated, though the same reference numerals are applied to corresponding parts.

In this case, stem engaging members 46' are four in number (though this is not limitative) being arranged in two pairs, the members of each pair being in diametrically opposed relation. Since members 46' are identical one with the other, only one need be described in detail.

A given member 46' is made up of lever 70 pivoted on arbor 71 which is end-supported in ribs 45 carried beneath table bushing 17'. Considering member 46' when in the position of Fig. 10, it will be seen that lever 70 consists of a depending, vertical and relatively short arm 72 and a relatively long arm 73 which inclines upwardly and outwardly. Pivoted at 74 to the lower end of arm 72 is jaw 75 which has a vertically extending work-engaging face 76 preferably having usual "wickers" or gripping serrations 77. Jaw 75 is cut away centrally as at 78 to take lever-end 72 and the weight of the jaw is so distributed that it normally hangs in the position of Fig. 10, though slot 78 opens to the edge of the jaw opposite face 76 to allow for relative pivotal movement between lever 70 and the jaw when member 46' is subsequently moved into operative position.

Lever arm 73 is so disposed and of such weight that it tends constantly to rotate lever 70 in a direction to carry jaw 75 radially inwardly and upwardly toward work D, and to insure or increase this tendency arm 73 may be weighted with lead 79 or the like.

As in the case of previously described members 46, the defining wall 14 of table bore 15 serves as means for holding the work-engaging member against rotational movement from retracted or inoperative position to projected or operative position. Here it is the upper end of arm 73 which is engaged by wall 14 to hold member 46' from swinging radially inwardly and upwardly, and thus normally maintains jaw 75 radially clear of drill stem D.

When occasion arises for removing table-bushing 17', drill stem D is first elevated sufficiently to enable the removal of slips W. Then lifting hooks (not shown) are applied to bars 25 and the bushing is elevated from table-bore 15. As the bushing clears the bore, the four members 46' swing radially inwardly and upwardly to their radially projected or operative position, as illustrated in Fig. 11, wickers 77 thus being brought into engagement with stem D. Subsequent upward movement of stem D has a tendency further to rotate members 46' and to cause jaws 75 to be more tightly constricted about stem D, whereupon further upward movement of the stem acts through members 46' to raise table bushing 17' bodily to any desired height, at which height it may be retained until occasion arises for reinserting it in the table-bore.

The lengths of lever arms 72 are such that with members 46' applied to a drill stem of given diameter, it is assured that pivots 74 cannot pass above the line of centers of shafts 71.

In re-inserting the bushing, stem D is lowered until the bushing is accessible for support by hooks applied to bars 25 and then while the weight of the bushing is taken on such hooks, the stem is further lowered to loosen jaws 75 from the stem. Then, while manually holding members 46' in retracted position, the bushing is lowered into the table bore, the defining wall 14 of that bore preventing members 46' from swinging to operative position during and after the final lowering operation.

In Figs. 13 to 15, inclusive, I have shown another variational embodiment of the invention, the principal distinction over the forms previously described lying in the fact that in this case the jaws may be released for movement into operative engagement with the drill stem while the table-bushing remains within the table-bore, it following that the bushing may be lifted from fully seated position in the table-bore to a position well above the top of the table by merely hoisting the drill stem.

Such of the parts as are the same as corresponding parts of the previously described apparatus will be given the same reference numerals, and the previously given description will apply thereto. Also, since the two diametrically opposed gripping members are identical, I will describe only one in detail.

In this case, the upper portion of the space between webs 45' is filled in as at 80 to provide material for defining vertically extending bore 81 and counterbore 82. Also, head 19' has an enlarged counterbore 83 registering with bore 81, and a horizontal bore 84 which opens at one end to counterbore 83 and at the other end, by way of counterbore 85, to the side edge of head 19'.

Pivotally supported at 86 between the lower extremities of ribs 45', is work-engaging member 46'' which is made up of crank 87, on the longer and downwardly inclined arm 88 of which is carried jaw 89. The connection between jaw and arm is by way of pivot pin 90, and the jaw presents a vertically extending, work-engaging face 91 which is preferably serrated or of wicker formation as at 92 to give it superior gripping characteristics.

The shorter and upwardly inclined crank arm 93 has lost-motion connection 94 with the vertically reciprocable plunger generally indicated at 95. Plunger 95 is made up of rod 96 having at its upper end an integral head 97 provided with lifting eye 98, while pinned at 99 to the lower end of the rod is an attachment head 100 adapted to reciprocate through counterbore 82 and forming one element of lost-motion connection 94. Compression spring 101 about rod 96 is interposed between washer 102 at the top of counterbore 82 and shoulder 103 on head 100, thus having a constant tendency to depress plunger 95 and thereby to swing member 46'' into operative position (Fig. 14).

Contact of the underside or shoulder 104 of head 97 with shoulder 104' at the bottom of counterbore 82, limits the downward movement of the plunger and the extent of swinging movement thereby imparted to member 46" while there is no stem in position for engagement by that member, but the relative dimensions of the parts are preferably such that with drill stem D' of given diameter, and with jaws 89 in full effective engagement with the stem, there will be vertical clearance between shoulders 104 and 104' (see Fig. 14).

Normally, plunger 95 will have been raised against the compression of spring 101 by engaging a lifting hook (not shown) in eye 98, member 46" thus being swung to the inoperative position of Fig. 13. Releasable means in the form of a latch generally indicated at 105 is provided for maintaining the plunger and member 46" in inoperative positions. The latch is in the form of a sliding bolt 106 in bore 84, the bolt carrying a pinned stop collar 107 which is adapted to slide through counterbore 85, and its nose 108 being adapted to be projected into counterbore 82 and beneath shoulder 104 to hold the plunger up.

Control handle 109 is attached at 110 to bolt 106 and extends upwardly through head-slot 111 into enlarged recess 112, where it may be grasped for operation. It will be noted that none of the elements project above the top face of the bushing and yet the plunger and control are readily accessible for operation from the top of the bushing.

When occasion arises for lifting bushing 17", the several latches 105 are shifted radially outward to release position, thus clearing noses 108 from beneath shoulders 104 and freeing plungers 95 for downward movement under the impulse of springs 101. Members 46" are thus swung into the operative position of Fig. 14, with faces 91 in engagement with stem D'. Subsequent upward movement of stem D' first more tightly engages jaws 89 with the stem and then acts through members 46" to lift the bushing from the table bore and to the desired position of elevation thereabove.

To replace the bushing, the stem is merely lowered until the bushing is seated in the table bore. By dropping the stem a little further, teeth 92 are loosened from about the stem and then plungers 95 are lifted by applying hooks (not shown) to eyes 98, members 46" thus being swung back to the inoperative position of Fig. 13—latches 105 being likewise returned to the position of that figure where they thereafter serve to maintain the plungers and hence members 46" in inoperative position until occasion again arises for removing the bushing.

While I have shown and described preferred and illustrative embodiments of my invention, it will be understood that various changes in design, structure and arrangement may be made without departing from the spirit and scope of the appended claims.

I claim:

1. In combination, a rotary table having a vertically extending bore, a bushing element movable vertically into and out of a seated position within said bore with the weight of the bushing imposed on the table, a pipe element extending vertically through the bushing bore, there being an annular space between said elements for the reception of slips or the like when the bushing is seated in the table bore, and supporting means secured to one of said elements and, when the bushing element is lifted from seated position, extending substantially horizontally from one element into engagement with the other element and, by virtue of that engagement, transferring the weight of the bushing element to the pipe element.

2. In combination, a rotary table having a vertically extending bore, a bushing element movable vertically into and out of a seated position within said bore with the weight of the bushing imposed on the table, a pipe element extending vertically through the bushing bore, there being an annular space between said elements for the reception of slips or the like when the bushing is seated in the table bore, and supporting means secured to one of said elements and, when the bushing element is lifted from seated position, extending from one element into engagement with the other element and, by virtue of that engagement, transferring the weight of the bushing element to the pipe element.

3. A bushing for the bore of a rotary table and embodying a body having a vertical bore adapted to take a pipe therethrough, and a pipe engaging member pivotally mounted on the body and movable pivotally upwardly from non-pipe-engaging position into pipe-engaging position.

4. A bushing for the bore of a rotary table and embodying a body having a bore adapted to take a pipe therethrough, and a pipe-engaging member pivotally connected to the body and movable pivotally upwardly from non-pipe-engaging position into pipe-engaging position while the bushing remains in the table-bore.

5. A table bushing embodying a body having a bore adapted to take a pipe therethrough, and a pipe-engaging member embodying a jaw pivotally connected to the body for movement into and out of pipe-engaging position and movable bodily with respect to the point of pivotal connection to vary its effective length.

6. A table bushing embodying a body having a bore adapted to take a pipe therethrough, a trunnion block pivoted to the body at one side of the bore, a jaw slidably associated with the block and pivotally movable therewith, and a screw threaded through the block and connected to the jaw for sliding the jaw with respect to the block in the direction of the axis of the screw.

7. In combination, a rotary table having a vertically extending bore, a bushing movable vertically into and out of seated position within said bore with the weight of the bushing imposed on the table when the bushing is seated, a pipe extending vertically through the bushing bore, there being an annular space between the bushing and pipe for the reception of removable slips or the like when the bushing is seated in the table bore, and releasable supporting means applied to said bushing and adapted to support it in a position of vertical clearance above said table while still encircling the pipe.

8. In combination, a rotary table having a vertically extending bore, a bushing movable vertically into and out of seated position within said bore with the weight of the bushing imposed on the table when the bushing is seated, a pipe extending vertically through the bushing bore, there being an annular space between the bushing and pipe for the reception of removable slips or the like when the bushing is seated in the table bore, and releasable supporting means coacting with the bushing and pipe and adapted to support the bushing in a position of vertical clearance above said table while still encircling the pipe.

9. A table bushing embodying a body having a bore adapted to take a pipe therethrough, a pivot pin on said body, a jaw pivotally mounted on said pin and extending lengthwise from one side thereof, said jaw being pivotally movable into and out of pipe-engaging position and being also movable in the direction of its length toward and away from the pivot, and means applied to said jaw and extending to the opposite side of the pin for shifting the jaw in the direction of its length to vary the effective length of the jaw.

WALTER A. ABEGG.